United States Patent [19]

Jones

[11] 4,195,725

[45] Apr. 1, 1980

[54] DRIVE UNIT FOR CABLE CONVEYOR

[75] Inventor: Robert D. Jones, Oskaloosa, Iowa

[73] Assignee: Intraco, Inc., Oskaloosa, Iowa

[21] Appl. No.: 907,136

[22] Filed: May 18, 1978

[51] Int. Cl.² .......................................... B65G 19/14
[52] U.S. Cl. .................................... 198/718; 198/716;
 198/729; 198/733; 198/814
[58] Field of Search ............... 197/716, 718, 720, 729,
 197/733, 814

[56] References Cited

U.S. PATENT DOCUMENTS

| 304,998 | 9/1884 | Everett | 198/716 X |
|---|---|---|---|
| 3,905,473 | 9/1975 | Jones et al. | 198/718 |
| 3,993,184 | 11/1976 | Campbell | 198/716 X |

FOREIGN PATENT DOCUMENTS 403867 3/1974 U.S.S.R. .................................. 198/814

Primary Examiner—Jeffrey V. Nase
Attorney, Agent, or Firm—Henderson & Sturm

[57] ABSTRACT

A conveyor system of a type including a tube, a cable having discs rigidly attached to and equally spaced along the cable for conveying granular or powdery materials within the tube is characterized by having an improved drive unit for causing and controlling the movement of the cable and discs through the tube.

5 Claims, 11 Drawing Figures

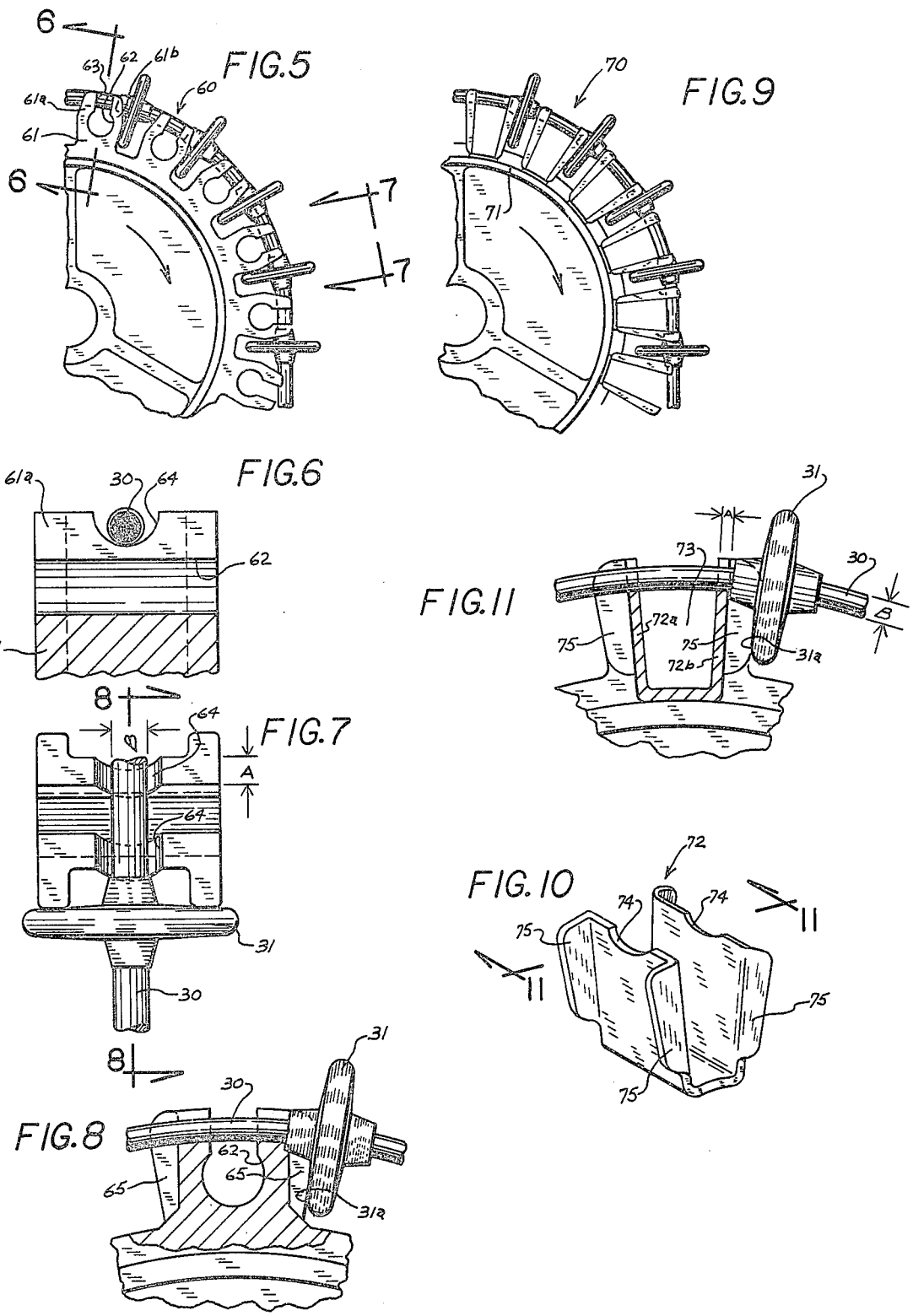

DRIVE UNIT FOR CABLE CONVEYOR

BACKGROUND OF THE INVENTION

In the field of cable conveyor systems of a type including a circuitous tube and a cable with a plurality of discs attached thereto for driving granular or powdery materials through such tube to a point of desired delivery, one of the most expensive elements of such system has always been the component used for driving the cable through the tube. One reason why this component has been so expensive is that it has always been felt to be necessary that the driving wheel of a cable conveying system be located such that it does not operate within the material being conveyed. For example, U.S. Pat. No. 3,905,473 shows a driving wheel which is disposed above the feed lines so that the material being conveyed will drop down off of the drive wheel. The reason that the prior art uses this arrangement is that when the drive wheel is disposed within the material being conveyed, the material builds up between the cable and the cable supporting surfaces of the driving wheel. Once this happens, the cable jumps off of the drive wheel and the system is rendered inoperative.

The prior art shows very large contact support surfaces on the driving wheel because it is necessary to support the cable sufficiently to keep it in the shape of a loop. If there are insufficient support surfaces on the driving wheel, excessive flexing of the cable will occur, which will result in premature failure of the cable. Usually, the support surfaces on the drive wheels in the prior art consist of a groove on equally spaced projections, these grooves having a length of several times the diameter of the cable it is driving. While this provides the needed support to the cable, it allows material to accumulate between the groove and the cable if the driving wheel is disposed in the material being conveyed, the problem referred to above of causing the cable to jump off of the driving wheel.

Accordingly, there is a need for less expensive driving wheels for cable conveyors which can operate within the material being conveyed, provide the necessary cable support, and operate dependably without a danger of the cable jumping off of the driving wheel.

SUMMARY OF THE INVENTION

In a conveyor system of the type including a tube, an endless cable having discs attached thereto at equally spaced intervals and a drive unit for driving the cable and discs through the cable for causing material to be pushed through the tube and thereby conveyed to points of destination, the drive unit being of an improved design which allows the driving wheel to be disposed within the material being conveyed. The driving wheel includes a circular member which is driven by a prime mover such as an electric motor through a gear box. The circular member has a plurality of projections connected at one end thereof to the circular member. The other end of the projections has a groove therein for receiving and supporting the cable, a driving surface on every other projection contacts one side of the discs to move the cable through the tube. The width of the projection or length of the groove is no more than one and one-half times the diameter of the cable so that materials do not accumulate in the groove which would cause the cable to jump off of the driving wheels.

An object of the invention is to provide an improved drive unit for a cable conveying system.

Another object of the invention is to provide a drive unit for a cable conveying system which is dependable to use and economical to construct.

A further object of the invention is to provide a drive unit for a cable conveying system which can operate within the material being conveyed.

Other objects, advantages and novel features of the present invention will become apparent from the following detailed description of the invention when considered in conjunction with the accompanying drawings.

BRIEF DESCRIPTION OF THE DRAWINGS

FIG. 5 is a partial top view of an alternate form of drive wheel for the present invention;

FIG. 6 is a partial cross-sectional view taken along line 6—6 of FIG. 5;

FIG. 7 is a partial view taken along line 7—7 of FIG. 5;

FIG. 8 is a partial cross-sectional view showing a cross-section of a portion of the drive wheel taken along line 8—8 of FIG. 7;

FIG. 9 is another embodiment of a drive wheel shown in the top plan view thereof;

FIG. 10 is a perspective view of a portion of the drive wheel as shown in FIG. 9; and FIG. 11 is a partial cross-sectional view taken along line 11—11 of FIG. 10.

DESCRIPTION OF THE PREFERRED EMBODIMENT

Figure 1:
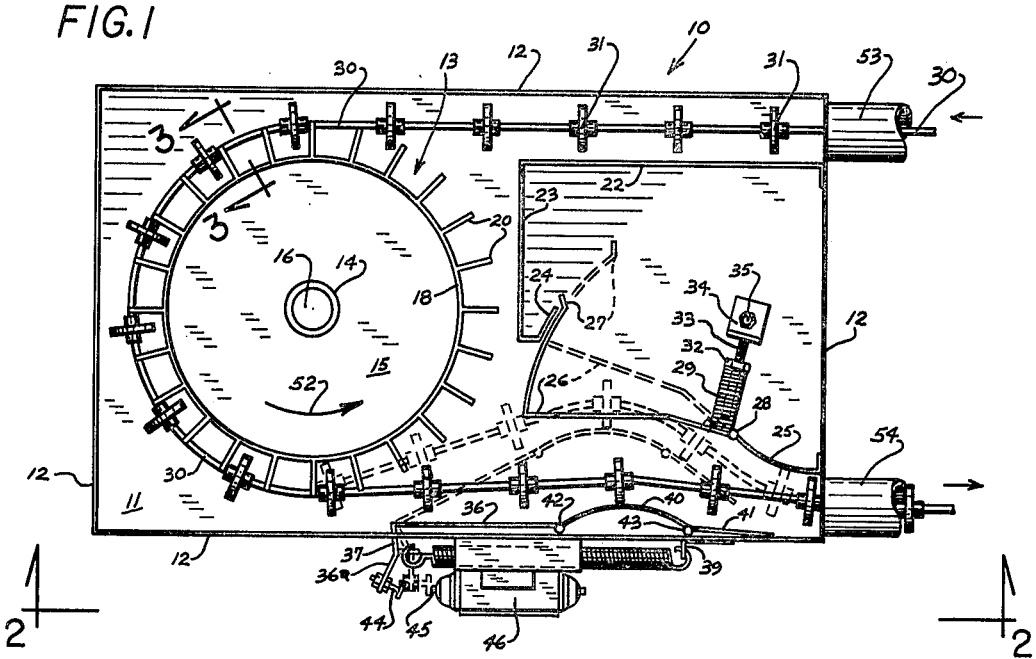
FIG. 1 is a top plan view of a first embodiment of present invention with the cover off to expose the working parts of a drive unit mechanism.
Figure 3:
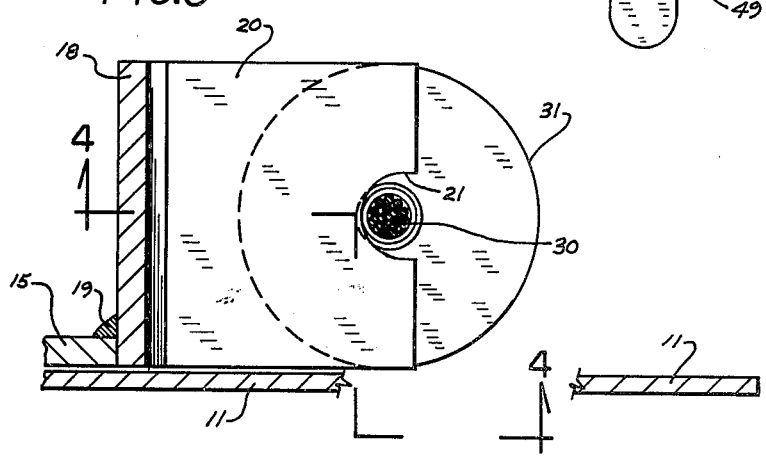
FIG. 3 is an enlarged partial cross-sectional view taken along line 3—3 of FIG. 1.
Figure 4:
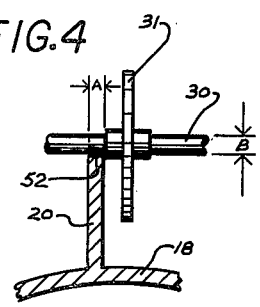
FIG. 4 is a cross-sectional view taken along line 4—4 of FIG. 3.

Referring now to the drawings wherein like reference numerals designate identical or corresponding parts throughout the several views, FIG. 1 shows a drive unit 10 constructed in accordance with the present invention. A housing is provided and includes a bottom 11 (FIG. 3) and sides 12. A drive wheel 13 is disposed within the housing and rests close to the floor 11 and is rotatably disposed by attachment of a circular portion 14 rigidly attached to a plate member 15, the sleeve 14 then being rigidly attached to a shaft 16 of a differential gear box 17. The plate member 15 of the drive wheel 14 has a circular portion 18 welded to the periphery thereof by means of weldments 19. Drive projections 20 extend radially outwardly from and are attached to the circular portion 18 as can best be seen in FIG. 1. The drive projections 20 include a groove 21 disposed in the end thereof. The width of such groove and projection member 20 has been given the dimension A as is shown in FIG. 4 and the cable diameter has been given a dimension B. These dimensions are critical, one with respect to the other as will be described in detail below. The housing also includes interior wall members 22, 23, 24 and 25 which are stationary and are rigidly connected to the floor 11. A moving wall 26 and 27 are rigidly connected together and pivotally connected to the wall 25 by means of a hinge 28. A compression spring 29 is provided for biasing the moveable walls 26 and 27 towards the cable member 30. The compression of the spring 29 is adjustable by means of a nut 32 threadably engaged upon a bolt member 33. The bolt member 33 is secured to a bracket 34 which is bolted to floor 11 of the housing by means of a nut and bolt device 35.

The cable 30 is of a circuitous type such as disclosed in U.S. Pat. Nos. 3,905,473 and 4,071,136, for example. Such cable 30 has a plurality of nylon discs members 31 rigidly secured thereto at regular intervals along the length thereof which are preferably spaced twice the distance between adjacent ends of the drive projections to allow the drive projections to be disposed within the material being conveyed.

Referring again to FIGS. 1 and 2 it is noted that a cable biasing and following member 36 is provided which extends through a slot 37 in one side 12 and is thereby pivotally attached to the housing and is movable between the positions shown in solid lines in FIG. 1 and the position shown in dashed lines in FIG. 1. A pair of tension springs 38 are secured to the end 36a which extends outwardly from the housing walls 12. These tension springs 38 are also attached to a bracket 39 which is rigidly attached to the one side 12 of the housing. These tension springs 38 tend to bias the member 36 towards the position shown in dashed lines in FIG. 1. The height of member 36 is not shown in the drawings but it is approximately the same height or perhaps slightly higher than the height of the drive projections 20, but it can be as high as the sides 12 of the housing. The height of the walls 22-27 are preferably about as high as the sides 12 of the housing.

Plate members 40 and 41 are also attached to the member 36. The member 40 is pivotally attached to the member 36 by means of a pivot 42 and the member 41 is pivotally attached to the member 40 by a hinge pivot 43. Stop projections (not shown) are provided on the members 36, 40 and 41 such that members 40 and 41 cannot pivot downwardly beyond the point shown in dashed lines in FIG. 1 such that they tend to push the cable 30 to the position shown in dashed lines in FIG. 1.

Figure 2:
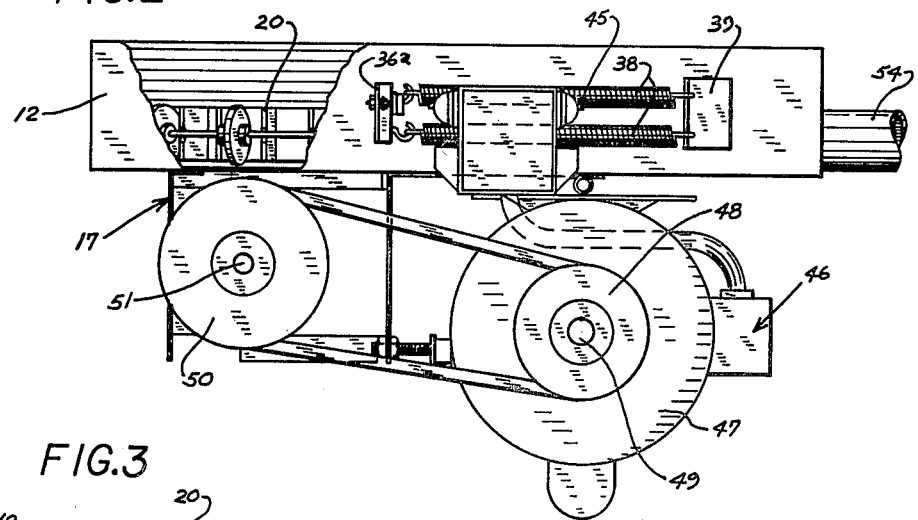
FIG. 2 is a side elevational view taken along line 2—2 of FIG. 1.

An adjustable nut mechanism 44 is provided on the end 36a of the member 36 for the purpose of contacting a shut-off button 45 when the member 36 is pivoted to the position shown in dashed lines in FIG. 1. When this occurs, the switch 46 shuts off the power to the motor 47 and thereby shuts off the entire drive unit 10. Referring to FIG. 2 it is noted that the motor 47, which happens to be of an electrical type, has a pulley 48 secured to an output shaft 49. This pulley 48, when rotated by the motor 47, turns the pulley 50 and an input shaft 51 of the gear box 17 which thereby causes rotation of the shaft 16 and thereby the drive wheel 13 when the motor 47 is on.

In operation, when the motor 47 is turned on and the drive wheel 13 is turning in the direction indicated by the arrow 52 in FIG. 1, the alternate drive projections 20 will contact a shoulder 52 on the disc members 31 to thereby cause the cable 30 and disc members 31 to move through the housing including members 11 and 12. A circuitous tube including an inlet tube 53 and an outlet tube 54 will normally be full of a granular or powdery material which will be pulled into the housing within the walls 12 and on top of the floor 11. Since this housing is filled with such material it is very important that such material not get between the cable 30 and fill the groove 21, since if this occurs the cable will jump off of the drive wheel 13 and the entire system will malfunction. It is for that reason that the dimension A cannot be more than one and one-half times the dimension B. In other words, the contact area on the top of the drive projection 20 cannot be more than one and one-half times the diameter of the cable 30.

Initially when the cable conveyor system is set up for use the cable would be fairly tight such that the normal path of the cable 30 would be as shown in solid lines in FIG. 1 with the members 36, 40 and 41 pushing against the disc members 31 to take up any slack, but there would be very little slack to be taken up. If the cable stretches somewhat, breaks, or for any other reason tends to have slack in it, this slack will be taken up if it is a small amount because of the force of the tension springs 38 pushing against the disc members 31. The force of the tension springs 38 are considerably more than that of the compression spring 29 so that the members 26 and 27 will tend to be maintained against the other side of the disc members 31 but will be pushed along with the cable as it has slack in it. This following of the cable by the walls 26 and the members 36, 40 and 42 tend to maintain a channel for the material being conveyed such that it does not build up excessively within the housing. For example, if the wall 26 were to be rigidly affixed in the position shown in dashed lines in FIG. 1 and not movable, then feed would build up between this wall and the cable such that the cable might not be able to move to the position shown in dashed lines in FIG. 1 because of a broken cable or the like and therefore the member 36 could not move to the position shown in dashed lines in FIG. 1. This could mean that even though the cable had broken or there became too much slack in the line that the member 44 would not contact the member 45 and shut off the motor 47 before serious damage to the unit could occur.

Referring now to FIGS. 5-8, and alternative form of the drive wheel is disclosed. The embodiment of FIGS. 5-8 is very similar to the type of drive wheel shown in U.S. Pat. No. 3,906,473 except that drive projections 61 have a bore 62 disposed therein and a slot 63 has been cut out from the top of the projection 61 down to the bore 62. The purpose of such modification of a prior art drive wheel is for the purpose outlined above, that is specifically to make the width A of the groove 64 of the supporting projection 61a and 61b of a width of no more than one and one-half times the diameter B of the cable 30. The clearance hole 62 along with the slot 63 not only insures and forms a relatively thin width for the grooves 64 but this also provides that material can be forced out of the groove 64 to one side or the other, for example into the clearance hole 62, so that it will not build up between the cable 30 and the supporting surfaces 64. The particular embodiment of FIG. 5 is constructed of cast aluminum but, of course, other materials of construction could be used.

Referring now to the embodiment shown in FIGS. 9-11 it is noted that a drive wheel 70 is shown which has an outer rim portion 71. A plurality of drive projections 72 are connected to the outer periphery of the rim 71 such as by welding. These drive projections 72, as shown in FIG. 10, are preferably of sheet metal and have supporting grooves 74 which are of a width A which is no greater than one and one-half times the diameter the cable 30, the dimension B. In the embodiments of FIGS. 9-11, as with the embodiment of FIGS. 5-8, driving projections are provided to actually push on the sides of the disc members 31 to pull the cable through the tubes 53 and 54 instead of in the manner shown in the FIG. 4 embodiment wherein the leading surface of the drive projection 20 contacts a small shoulder 52 to drive the cable. Upstanding portions 72a and 72b of the drive projections 72 have a space 73 therebetween to allow material being conveyed which must be between the cable 30 and the supporting surface 74 to freely be removed from such portion, it being understood that a great deal of pressure is being exerted by the cable 30 onto the surface 74. The drive projection flanges 75 contact the disc member 31 at the points 31a in a similar manner that the drive projections 65 in the embodiment of FIGS. 5-8 contact the disc members 31 at the points 31a. It will also be very clear that the cable may be driven in either direction using any one of the three preferred embodiments disclosed herein.

In all three embodiments disclosed, there is more than one supporting projection between each adjacent disc member 31. The reason for such an arrangement is to prevent excessive flexing of the cable 30. If such supporting structures are not provided, the cable section between drive projections will straighten out and thereby flex as such cable section goes over the drive wheel rather than to be maintained in an arcuate shape. As mentioned above, however, if wide supporting structures are used such as in the prior art to solve this problem, then such drive wheel cannot be disposed within the material being conveyed.

Accordingly it can be readily appreciated that all of the objects referred to above have been accomplished by use of the structures disclosed herein. Obviously, many modifications and variations of the present invention are possible in light of the above teachings. It is therefore to be understood that, within the scope of the appended claims, the invention may be practiced otherwise than as specifically described.

I claim:
1. A conveyor system comprising:
a tube;
an endless cable disposed in said tube;
a plurality of disc members rigidly attached to said cable and evenly spaced along the entire length of said cable;
drive means for moving said cable and disc members through said tube, said drive means including:
a housing;
a circular member disposed within said housing;
a plurality of spaced drive projections attached at one end thereof to said circular member at spaced intervals, said drive projections extending radially outwardly from said circular members and a groove being disposed in the other end of said drive projections for reception of a portion of the cable;
a cable tightening means attached to said housing for taking slack out of said cable, said cable tightening means including a lever member pivotally attached to said housing and means for biasing said lever member towards said cable;
a moveable wall pivotally attached to said housing on the opposite side of said cable from said lever member and biasing means for biasing said moveable wall towards said cable whereby material being conveyed will be channelled between the lever member and the moveable wall thereby preventing material being conveyed from accumulating in said housing.

2. A conveyor system as defined in claim 1 wherein said biasing means of said lever member is stronger than the biasing means of said moveable wall means.

3. A conveyor system as defined in claim 2 including means for sealing said moveable wall member to said housing whereby material being conveyed is prevented from collecting behind said moveable wall.

4. A conveyor system as defined in claim 1 wherein the portion of said cable disposed within said drive means housing lies substantially within a single plane.

5. A conveyor system as defined in claim 1 including means associated with said cable tightening means for shutting off the power to said drive means when said cable becomes too loose.

* * * * *